United States Patent Office 3,467,266
Patented Sept. 16, 1969

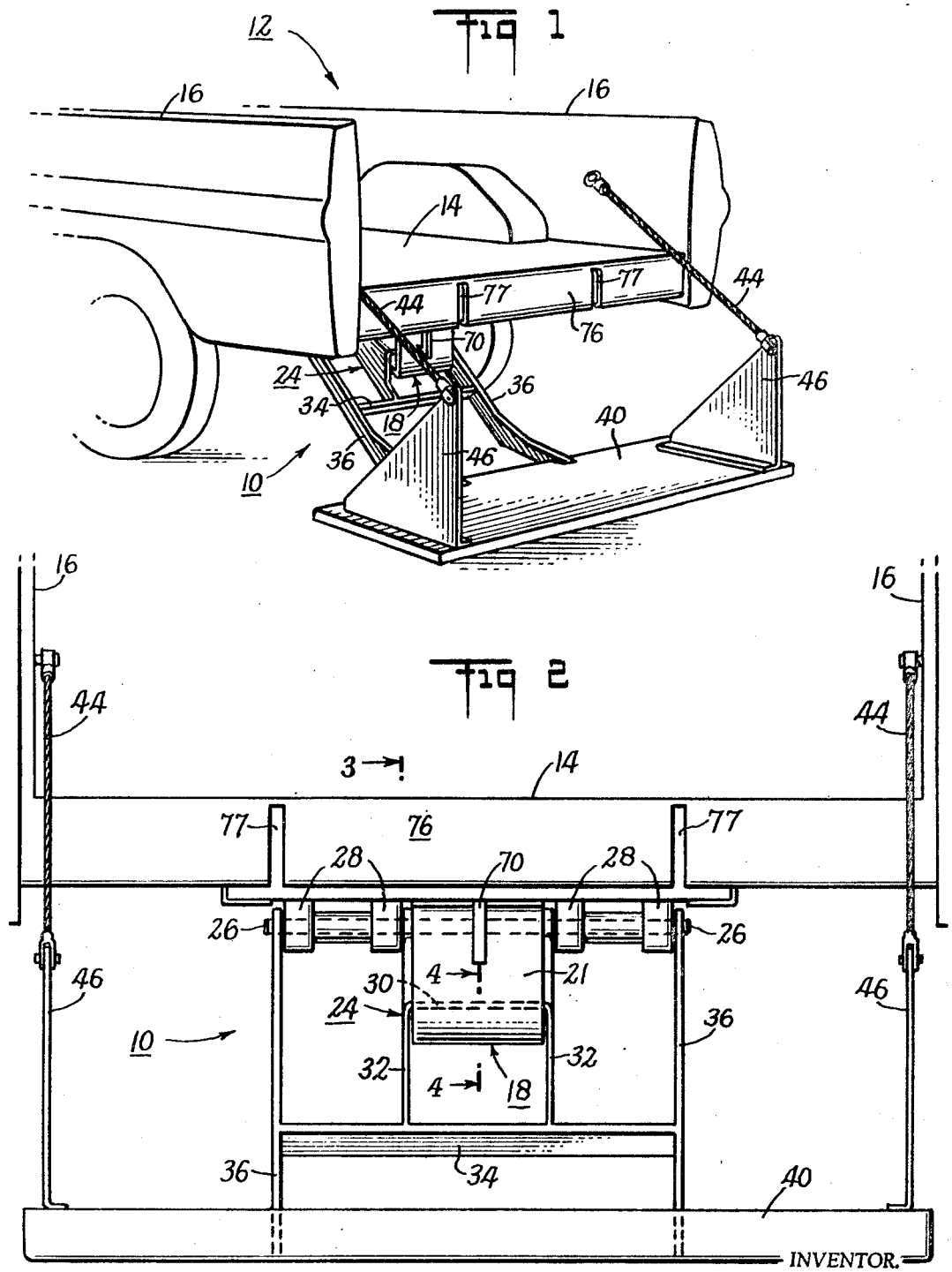

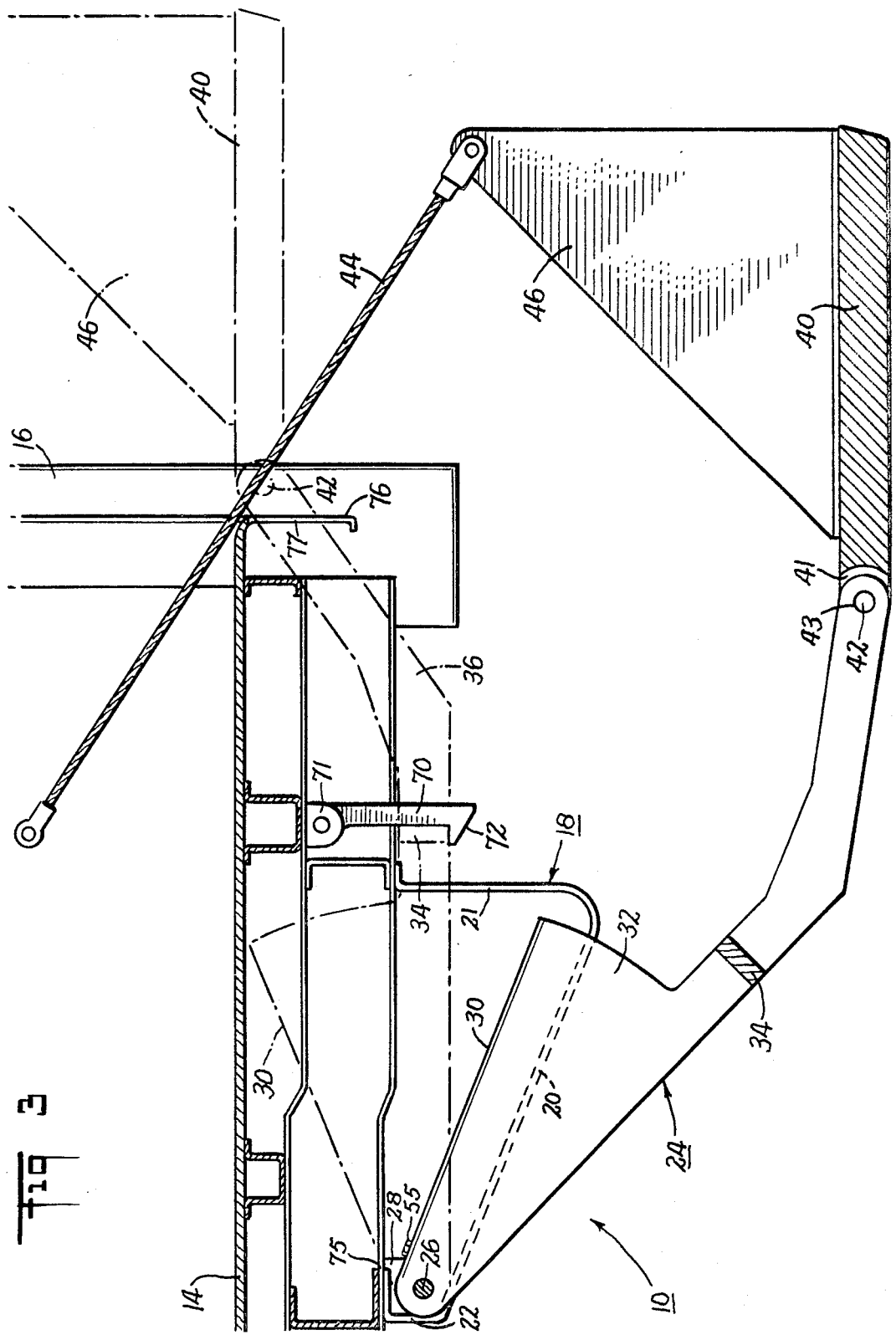

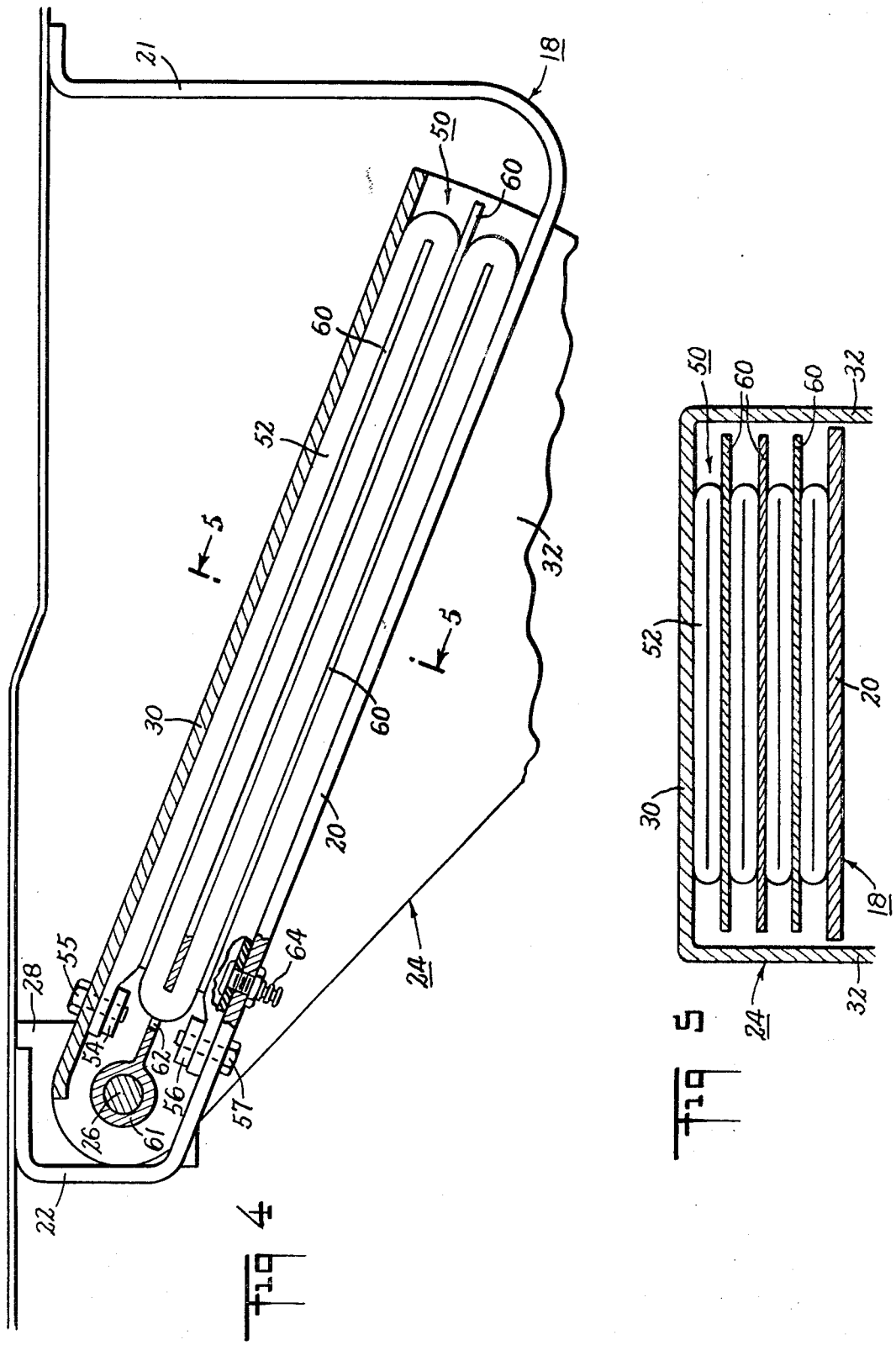

3,467,266
PNEUMATIC TAILGATE LIFT
John A. Vanderjagt, Memphis, Tenn., assignor to Scienco, Inc., Memphis, Tenn.
Filed Jan. 31, 1968, Ser. No. 702,070
Int. Cl. B60p 1/44; B66f 3/34; F01b 19/04
U.S. Cl. 214—77         9 Claims

ABSTRACT OF THE DISCLOSURE

The disclosed tailgate lift includes a base attached to a truck beneath its loadbed. A pneumatic element in the form of a folded, close-ended, tubular member is disposed between the base and a pivotally mounted lifting member. The lifting member carries a lift platform which, upon actuation of the pneumatic element, moves between a position adjacent the ground to an elevated position level with the loadbed for convenient cargo loading and unloading. The platform swings to a vertical orientation while in the raised position to serve as the truck tailgate.

Related application

In the preferred embodiment of the invention described and claimed herein, the pneumatic actuating element takes the form of an elongated tubular element having its ends closed off and folded several times on itself. Such a pneumatic element is disclosed in my copending application entitled "Jacks Employing Elongated Tubular Pneumatic Elements," Ser. No. 624,037, filed Mar. 17, 1967; now Patent No. 3,379,411 granted Apr. 23, 1968; the disclosure therein being specifically incorporated herein by reference.

Background and summary of the invention

Heretofore, commercially available truck tailgate lifts have been essentially customized, factory-installed units. Invariably, to equip a truck with a tailgate lift requires material changes in the rearward end portion of the truck as compared to those trucks not so equipped. Such tailgate lifts are relatively massive in size and weight, and quite expensive. Hydraulics is almost universally used as the actuating system, further adding to the size and weight of the units. In order to accommodate the hydraulic actuating system, the clearance between the loadbed and the ground must be considerable. Consequently, such tailgate lift units are readily available for larger trucks, but not generally avaliable for the so-called "pickup" size trucks.

While it might be said that tailgate lifts for pickup trucks are not particularly necessary due to the relatively low height of the loadbed relative to the ground and the fact that pickup trucks typically are not called upon to haul heavy, unweildy objects, nevertheless, pickup trucks are used in many instances to haul unweildy objects such as refrigerators, freezers, etc. Such objects present considerable loading and unloading difficulties which would be relieved considerably if the pickup truck were equipped with a tailgate lift.

The present invention provides a tailgate lift particularly suited for pickup trucks but readily adaptable as well to trucks of larger size. My tailgate lift is inexpensive to manufacture and readily adapted to a truck without requiring significant revision of the truck's rearward end section. My tailgate lift is compact in size with the actuating system virtually concealed beneath the loadbed to the extent that, when the lift platform is so positioned to serve as the tailgate, the truck appears as any other truck no equipped with my invention.

As an important feature of my invention, I employ a pneumatic actuating element which not only can be accommodated in a smaller space than a hydraulic actuating element, but is considerably less expensive. While I prefer to employ a folded, close-ended tubular member as the pneumatic element it will be appreciated that it may take other forms such as bellows, inflatable bags, etc.

The pneumatic element is disposed between a base member, rigidly affixed to the underside of the loadbed at a point considerably inward from the rearward end thereof, and a lifting member pivotally mounted relative thereto. The lifting member includes spaced lifting arms which extend rearwardly and pivotally mount a lift platform at their free ends. Actuation of the pneumatic element forcibly moves the lifting member relative to the base to in turn move the lift platform between a position on the ground to a raised position level with the load-bed. While being so moved, the lift platform is maintained in a generally horizontal orientation by a parallel linkage arrangement. The lift platform, while being in the raised position, can be swung upwardly on the lifting arms to a generally vertical orientation, thus to serve as the truck tailgate. Latch means are provided for maintaining the lift platform in its tailgate position irrespective of the condition of the pneumatic element.

The invention comprises the features of construction, combination of elements, and arrangement of parts which will be exemplified in the construction hereinafter set forth, and the scope of the invention will be indicated in the claims.

For a fuller understanding of the nature of the invention, reference should be had to the following detailed description taken in connection with the accompanying drawings in which:

FIGURE 1 is a perspective view of the rearward end portion of a pickup truck equipped with a preferred embodiment of my invention;

FIGURE 2 is an end elevational view of FIGURE 1;

FIGURE 3 is an enlarged sectional view taken along line 3—3 of FIGURE 2;

FIGURE 4 is an enlarged sectional view taken along line 4—4 of FIGURE 2; and

FIGURE 5 is an enlarged sectional view taken along line 5—5 of FIGURE 4.

Similar reference numerals refer to like parts throughout the several views of the drawings.

Detailed description of the preferred embodiment

Referring now to FIGURE 1, the tailgate lift constructed according to a preferred embodiment of my invention is generally indicated at 10 and is shown adapted to a pickup truck generally indicated at 12 having a loadbed 14 flanked by sides 16.

As best seen in FIGURES 3 and 4, the tailgate lift 10 includes an open-sided base generally indicated at 18, having a sloping bottom plate 20, an end plate 21 and a shorter end plate 22. The upper ends of end plates 21 and 22 are welded or otherwise suitably attached to the underside of the reinforced truck loadbed 14. A lifting member, generally indicated at 24, is pivotally mounted on a shaft 26 mounted by spaced brackets 28 depending from the underside of the loadbed 14 as best seen in FIGURE 2. Shaft 26 extends through the base member 18 adjacent its short end plate 22.

The lifting member 24 includes a top plate 30 disposed in overlying relation to the sloping bottom plate 20 of base 18. Side plates 32 extend downwardly and rearwardly from top plate 30, to a point where they are welded to a cross-member 34 (FIGURES 2 and 3). The ends of cross-member 34 are welded to elbow-shaped lifting arms 36, which are also pivotally mounted on shaft 26 as best seen in FIGURE 2.

The lower, rearward ends of the lifting arms 36 pivotally mount a lift platform 40. As seen in FIGURES 1 and 3, the ends of arms 36 are received in notches 41 formed in the inner edge of platform 40. A shaft 42 incorporated in the platform 40 along its inner edge is inserted through apertures 43 in the ends of arms 36.

In order to maintain the lift platform 40 generally horizontally oriented during a lifting or lowering operation, a parallel linkage arrangement in the form of cables 44 are employed. As best seen in FIGURES 1 and 2, each cable 44 is affixed at one end to its associated side 16. The other ends of cables 44 are hingeably connected to the apexes of upright triangular plates 46. The bases of these plates 46 are attached to the lift platform 40 adjacent each of its lateral edges.

In order to forcibly raise and lower the lift platform 40, I provide a pneumatic element 50 which is interposed between the top plate 30 of lifting member 24 and the sloping bottom plate 20 of base 18. As best seen in FIGURES 4 and 5, the pneumatic element 50 takes the form of an elongated tubular member 52 which may be a section of conventional fire hose as disclosed in my above noted co-pending application, S.N. 624,037. One end of the hose 52 is pinched off between the top plate 30 of lifting member 24 and a clamping bar 54. A series of bolts 55, passing through plate 30 and the end of the hose 52 and threaded into the clamping bar 54, are tightened down to completely seal off the end of the hose clamped therebetween. The tubular member is folded four times on itself with its other end pinched off between a clamping bar 56 and the sloping bottom plate 20 of base 18 using bolts 57.

An air fitting 64 mounted in plate 20 of base 18 communicates with the interior of the hose 52 for inflation and deflation thereof. Since expansion of the portions of the hose adjacent the folds near the shaft 26 is restricted, the overall pneumatic element expands generally in the manner of a fan being unfolded. The expanding hose 52 acts against plates 20 and 30 causing the lift platform 40 to rise upwardly toward a position level with the loadbed 14. As is disclosed in my above-noted co-pending application, a rope running the length of the hose 52 prevents its wall from pinching completely together, thus insuring that the inflating gas is disturbed throughout its length.

Also as seen in FIGURES 4 and 5, I provide separators 60 between overlying sections of the hose 52. These separators provide flat backing surfaces for the folded sections of the member to expand against, thus eliminating any tendencies of the sections to slide laterally relative to each other. The center separator 60 is hingeably connected to the shaft 26 as seen at 61 and slotted as seen at 62 to accommodate passage of the hose 52 therethrough.

The source of pressurized gas for actuating the pneumatic element 50 may take the form of a compressor driven off of the truck engine. Alternatively, one of the cylinders of the engine may be tapped to supply gases under pressure to the pneumatic element during either or both the compression or explosion stroke of the piston therein.

As is seen from FIGURES 3 and 4, the hose 52 is completely deflated in order to position the lift platform 40 on the ground. The hose 52 is then inflated to raise the lift platform 40 to its position shown in phantom in FIGURE 3. At this point, the cargo being loaded may be slid from the lift platform 40 to the loadbed 14 or cargo to be unloaded is slid from the loadbed to the lifting platform for lowering to the ground. When the loading or unloading operation has been completed, the lift platform 40, while in its raised position shown in phantom in FIGURE 3, is swung upwardly to a generally vertical orientation and retained in place by suitable latch means (not shown), thus to serve as the truck tailgate. At this point, the cables 44 hang loosely.

Also as best seen in FIGURE 3, in order that maintenance of the lift platform 40 in its elevated position, particularly when serving as the tailgate, is not solely predicted on the continued inflation of the pneumatic element 50, a latch 70 is additionally provided. As seen in FIGURE 3, the latch 70 is hingeably connected to a bracket 71 affixed to the undersurface of loadbed 14. The other end of the latch 70 is formed into a hook 72 which engages the underside of cross-member 34, thus insuring against inadvertent lowering of the lift platform 40.

Again as seen in FIGURE 3, a portion of the reinforcing structure for loadbed 14 is cut away, as indicated at 75, in order to accommodate movement of the lifting member 24. In addition, the rearward facing plate 76 for loadbed 14 is slotted as indicated at 77 for reception of the lifting arms 36 when the lift platform 40 is brought to its elevated position.

It will be appreciated that the principles of the instant art invention may be readily adapted to a dump truck wherein the pneumatic element 50 is implemented to raise the truck loadbed pursuant to cargo discharge. In addition, my invention could be readily adapted to operate the landing gear of semi-trailer trucks. Moreover, while I prefer to use a gas as the actuating medium, it will be appreciated that I can also use a liquid to actuate the pneumatic element 50. Therefore, I do not intend, by use of the term "pneumatic" herein to limit my invention solely to use with gases as the actuating medium.

It will thus be seen that the objects set forth above, among those made apparent from the preceding description, are efficiently attained and, since certain changes may be made in the above construction, without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In combination with a cargo vehicle equipped with a source of fluid under pressure, a pneumatic lift comprising
   (A) a base secured to the vehicle;
   (B) a lifting member mounted for movement relative to said base;
   (C) a cargo lifting tailgate located at the discharge end of a vehicle loadbed and connected to said lifting member for movement in conjunction therewith;
   (D) an expansible pneumatic element disposed substantially between said base and said lifting member said element including an elongated, tubular member folded at least once on itself, the ends thereof being closed off to provide a fluid tight chamber; and
   (E) an external connection communicating with the interior of said pneumatic element for conveying pressurized fluid to actuate said pneumatic element and move said lifting member relative to said base,
      (1) thus to move said tailgate pursuant to convenient cargo handling.

2. The pneumatic lift defined in claim 1, and
   (A) means maintaining said tailgate generally horizontally oriented as it is moved by said lifting member between a position adjacent the ground to an elevated position substantially level with the vehicle loadbed.

3. The pneumatic lift defined in claim 2 which further includes
   (A) means pivotally mounting said tailgate to said lifting member such that said tailgate may be swung into a generally vertical orientation while in said elevated position to close the discharge end of the vehicle loadbed.

4. The pneumatic lift defined in claim 2 wherein
   (1) said base is comprised of (a) a sloping bottom plate supported in spaced relation from the underside of the vehicle loadbed, and
(2) said limting member includes
(a) a top plate disposed in overlying relation to said bottom plate,
(b) said pneumatic element being interposed substantially between said top and bottom plates.

5. The pneumatic lift defined in claim 4 wherein said lifting member further includes
(1) a pair of spaced lifting arms rigidly connected to said top plate, said arms
(a) extending generally rearwardly toward the discharge end of the vehicle loadbed,
(b) said tailgate being pivotally connected to the free ends of said arms.

6. The pneumatic lift defined in claim 2 wherein said maintaining means includes
(1) parallel linkage means interconnecting the vehicle and said tailgate, said linkage means
(a) operating to maintain said tailgate horizontally oriented during vertical movement thereof.

7. The pneumatic lift defined in claim 6 wherein said linkage means consists of
(1) at least one inelastic, flexible member enabling said tailgate to assume a vertical orientation effective to close off the discharge end of the vehicle loadbed.

8. The pneumatic lift defined in claim 3 which further includes
(A) latch means carried by the vehicle, said latch means
(1) operating to releasably latch said lifting member with said platform in said elevated position.

9. The pneumatic lift defined in claim 5 wherein said lifting arms are formed having a crooked configuration so as to avoid interference with the vehicle loadbed structure during vertical movement of said tailgate.

References Cited

UNITED STATES PATENTS

| | | |
|---|---|---|
| 2,001,744 | 5/1935 | Patterson. |
| 2,289,549 | 7/1942 | Norstrom _____ 92—91 |
| 2,377,170 | 5/1945 | Morgan _____ 92—90 X |
| 2,542,047 | 2/1951 | Mullin. |
| 2,749,592 | 6/1956 | Vartia. |
| 2,804,118 | 8/1957 | Bayerkohler. |
| 3,305,112 | 2/1967 | Brown. |

GERALD M. FORENZA, Primary Examiner

ROBERT J. SPAR, Assistant Examiner

U.S. Cl. X.R.

92—90; 254—93